(12) United States Patent
Shin et al.

(10) Patent No.: US 10,468,663 B2
(45) Date of Patent: Nov. 5, 2019

(54) ELECTRODE WITH POROUS BINDER COATING LAYER, METHOD FOR MANUFACTURING THE SAME, AND LITHIUM SECONDARY BATTERY COMPRISING THE SAME

(71) Applicant: LG Chem, Ltd., Seoul (KR)

(72) Inventors: Hyun-Kyung Shin, Daejeon (KR); Min-Hyung Kim, Daejeon (KR); Dong-Wook Sung, Daejeon (KR); In-Hyouk Sung, Daejeon (KR); Ji-Eun Lee, Daejeon (KR); Joo-Sung Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/544,451

(22) PCT Filed: Mar. 11, 2016

(86) PCT No.: PCT/KR2016/002453
§ 371 (c)(1),
(2) Date: Jul. 18, 2017

(87) PCT Pub. No.: WO2016/148447
PCT Pub. Date: Sep. 22, 2016

(65) Prior Publication Data
US 2017/0365841 A1    Dec. 21, 2017

(30) Foreign Application Priority Data
Mar. 17, 2015  (KR) ........................ 10-2015-0036784

(51) Int. Cl.
*H01M 4/139*  (2010.01)
*H01M 4/04*   (2006.01)
(Continued)

(52) U.S. Cl.
CPC ........... *H01M 4/0414* (2013.01); *H01M 4/13* (2013.01); *H01M 4/139* (2013.01); *H01M 4/623* (2013.01);
(Continued)

(58) Field of Classification Search
CPC .......... H01M 4/04; H01M 4/139; H01M 2/14; H01M 2/16
See application file for complete search history.

(56) References Cited

U.S. PATENT DOCUMENTS

| 5,384,685 | A |   | 1/1995 | Tong et al. |
| 6,124,061 | A | * | 9/2000 | Hamano ............. H01M 2/1673 |
|           |   |   |        | 429/316 |

(Continued)

FOREIGN PATENT DOCUMENTS

| JP | 2003305822   | 10/2003 |
| JP | 2006338993 A | 12/2006 |

(Continued)

OTHER PUBLICATIONS

International Search Report from PCT/KR2016/002453, dated Jul. 25, 2016.

*Primary Examiner* — James Lee
(74) *Attorney, Agent, or Firm* — Lerner, David, Littenberg, Krumholz & Mentlik, LLP

(57) ABSTRACT

An electrode with a porous binder coating layer may be manufactured in a method including (S10) a step of preparing the electrode including an active material layer formed on at least one surface of a current collector; (S20) a step of acquiring a binder emulsion by adding a binder to a dispersion medium; and (S30) a step of coating the binder emulsion acquired at the step (S20) on a surface of the active (Continued)

material layer of the electrode in a screen printing method using a mesh to form a binder coating layer of a porous structure.

9 Claims, 2 Drawing Sheets

(51) Int. Cl.
*H01M 4/13* (2010.01)
*H01M 4/62* (2006.01)
*H01M 10/0525* (2010.01)
*H01M 10/052* (2010.01)
*H01M 4/02* (2006.01)

(52) U.S. Cl.
CPC ...... *H01M 10/0525* (2013.01); *H01M 10/052* (2013.01); *H01M 2004/021* (2013.01)

(56) References Cited

U.S. PATENT DOCUMENTS

| | | |
|---|---|---|
| 6,148,503 A | 11/2000 | Delnick et al. |
| 6,692,543 B1 | 2/2004 | Hamano et al. |
| 2009/0136846 A1 | 5/2009 | Lee et al. |
| 2011/0005941 A1 | 1/2011 | Blythe et al. |

FOREIGN PATENT DOCUMENTS

| | | |
|---|---|---|
| JP | 2008084742 A | 4/2008 |
| JP | 2013064516 A | 4/2013 |
| KR | 20090055305 A | 6/2009 |
| KR | 20100024358 A | 3/2010 |
| KR | 20140055064 A | 5/2014 |
| KR | 20140079712 A | 6/2014 |
| WO | 9931749 A1 | 6/1999 |
| WO | 9941797 A1 | 8/1999 |

* cited by examiner

ELECTRODE WITH POROUS BINDER COATING LAYER, METHOD FOR MANUFACTURING THE SAME, AND LITHIUM SECONDARY BATTERY COMPRISING THE SAME

CROSS-REFERENCE TO RELATED APPLICATION

This application is a national phase entry under 35 U.S.C. § 371 of International Application No. PCT/KR2016/002453, filed Mar. 11, 2016, which claims priority to Korean Patent Application No. 10-2015-0036784, filed Mar. 17, 2015, the disclosures of which are incorporated herein by reference.

TECHNICAL FIELD

The present disclosure relates to an electrode with porous binder coating layer, method for manufacturing the same, and lithium secondary battery comprising the same.

BACKGROUND ART

Recently, interest in energy storing technologies is gradually increasing. As application areas expand to energies for mobile phones, camcorders and notebook PCs, and further, electric vehicles, efforts for research and development on electrochemical device are gradually materializing. Electrochemical device is a field gathering the most attention in this aspect, and especially, development on chargeable and dischargeable secondary batteries is becoming the focus of interest.

Of the secondary batteries that are currently being applied, the lithium secondary battery developed in the early 1990s is coming into the spotlight due to advantages of higher operating voltage and greater energy density compared to conventional batteries such as Ni-MH.

Generally, a lithium secondary battery is manufactured by storing an electrode assembly consisting of a cathode, an anode and a separator interposed there between, in a battery case, and then injecting electrolyte. Here, if the adhesion strength of the electrode and the separator included in the lithium secondary battery is weak, it affects the performance and safety of the battery. Therefore, in order to secure the adhesion strength of the electrode and the separator, an adhesion layer is formed on a surface of the separator, and in prior art, as the adhesion layer, a binder layer used to be formed by inducing phase separation on the surface of the separator, in which case thinning the binder layer was difficult. For realizing the performance of the battery, especially, for excellent output, the binder layer needs to be formed as a thin film, and maintain a porous structure.

DISCLOSURE

Technical Problem

The present disclosure is designed to solve the problems of the related art, and therefore the present disclosure is directed to providing an electrode with a porous binder layer capable of improving the adhesiveness with a separator while minimizing output degradation of a battery, a method for manufacturing the same, and a lithium secondary battery comprising the same.

Technical Solution

In one aspect of the present disclosure, there is provided an electrode including an active material layer formed on at least one surface of a current collector, the electrode further including a binder coating layer of a porous structure formed in a screen printing method using a mesh.

The binder coating layer may include a polyvinylidene fluoride (PVdF)-based polymer.

In the present disclosure, the PVdF-based polymer may be selected from a group consisting of polyvinylidene fluoride-co-hexafluoropropylene, polyvinylidene fluoride-co-trichloroethylene, polyvinylidene fluoride-co-tetrafluoroethylene, polyvinylidene fluoride-co-trifluoroethylene, polyvinylidene fluoride-co-trifluorochloroethylene, polyvinylidene fluoride-co-ethylene, and a mixture of two or more thereof.

A thickness of the binder coating layer may be 0.5 to 5 μm.

According to another aspect of the present disclosure, an electrode with the porous binder coating layer may be manufactured in a method including (S10) preparing the electrode including an active material layer formed on at least one surface of a current collector; (S20) acquiring a binder emulsion by adding a binder to a dispersion medium; and (S30) coating the binder emulsion acquired at step (S20) on a surface of the active material layer of the electrode in a screen printing method using a mesh to form a binder coating layer of a porous structure.

At step (S30), the mesh may be applied in the form of a roll.

The process of forming the coating layer of the step (S30) may include, more specifically, (S31) arranging the electrode such that the active material layer faces the mesh roll; (S32) winding the electrode in a rotating direction of the mesh roll or in a reverse direction thereof while rotating the mesh roll; and (S33) injecting the binder emulsion during the rotation of the mesh roll and the winding of the electrode to coat the binder emulsion on the surface of the active material layer of the electrode in a mesh pattern.

The coated mesh pattern may be dried during the rotation of the mesh roll and the winding of the electrode.

The drying may be performed at 25 to 300° C., and preferably, at 25 to 150° C. The drying may be performed using an air flow, and here, an amount of water vapor forming the air flow may be within a range of 1 to 589 g/m$^3$.

The binder coating layer may be formed in a thickness of 0.5 to 5 μm.

At the step (S20), the polymer binder and the dispersion medium may be used in a weight ratio of 1:99 to 99:1.

In the present disclosure, the binder may be a polyvinylidene fluoride (PVdF)-based polymer.

The PVdF-based polymer may be selected from a group consisting of polyvinylidene fluoride-co-hexafluoropropylene, polyvinylidene fluoride-co-trichloroethylene, polyvinylidene fluoride-co-tetrafluoroethylene, polyvinylidene fluoride-co-trifluoroethylene, polyvinylidene fluoride-co-trifluorochloroethylene, polyvinylidene fluoride-co-ethylene, and a mixture of two or more thereof.

Further, the dispersion medium may be acetone, tetrahydrofuran, methylenechloride, chloroform, dimethylformamide, N-methyl-2-pyrrolidone (NMP), cyclohexane, water or a combination thereof.

According to another aspect of the present disclosure, there is provided a lithium secondary battery including a cathode, an anode, a separator interposed between the cathode and the anode and a nonaqueous electrolyte, wherein at least one of the cathode and the anode is the electrode mentioned above.

Advantageous Effects

According to the present disclosure, a binder emulsion may be coated on an electrode such that it has a thin thickness using a mesh while winding the electrode. Since the binder coating layer formed as aforementioned is formed as a thin film and has a porous structure, the electrode with the binder coating layer may not only exhibit excellent adhesion strength to the separator but also minimize output degradation when applied to a lithium secondary battery.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

An electrode according to the present disclosure is characterized by having a binder coating layer of a porous structure coated in a screen printing method that uses a mesh.

Figure 3:
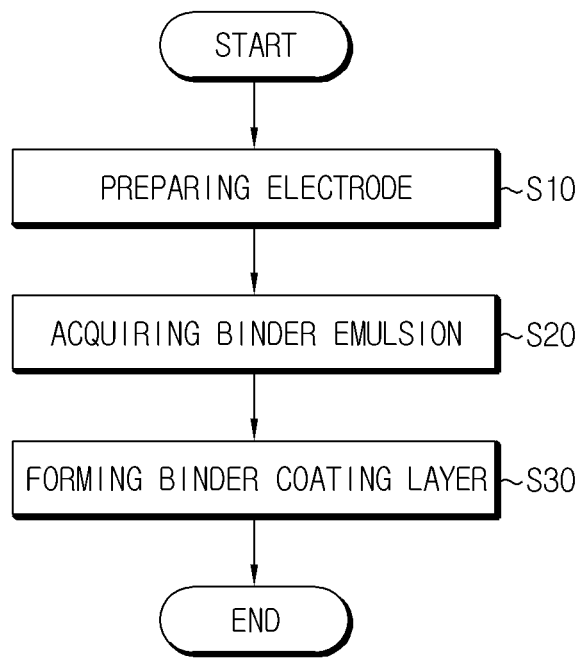
FIG. 3 is a flowchart of a method for manufacturing the electrode according to an embodiment of the present disclosure.

FIG. 3 is a flowchart of a method for manufacturing the electrode according to an embodiment of the present disclosure.

Referring to FIG. 3, a method for producing the electrode according to an embodiment of the present disclosure may include (S10) a step of preparing the electrode including an active material layer formed on at least one surface of a current collector, (S20) a step of acquiring a binder emulsion by adding a binder to a dispersion medium, (S30) a step of coating the binder emulsion acquired at the step (S20) on a surface of the active material layer of the electrode in a screen printing method using a mesh to form a binder coating layer of a porous structure.

Figure 4:
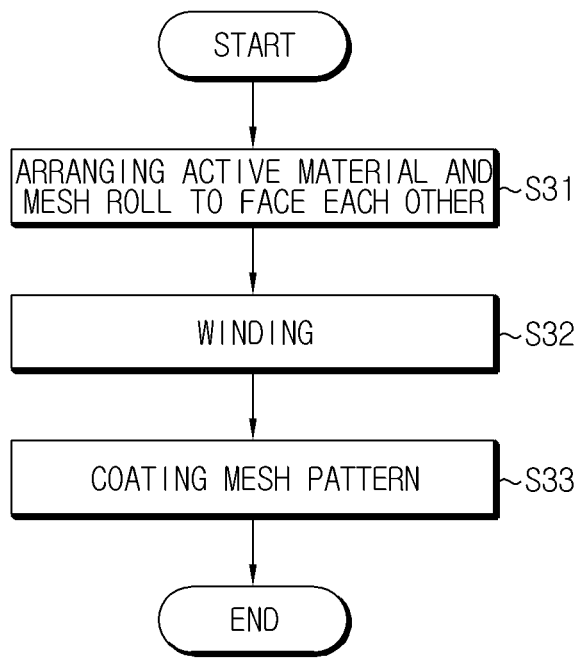
FIG. 4 is a flowchart of a step of forming a binder coating layer included in the method for manufacturing the electrode according to an embodiment of the present disclosure.

Further, FIG. 4 is a flowchart of the step of forming the binder coating layer included in the method for producing the electrode according to an embodiment of the present disclosure, and referring to FIG. 4, the step of forming the binder coating layer includes (S31) arranging the electrode such that the active material layer faces the mesh roll, (S32) winding the electrode in a rotating direction of the mesh roll or in a reverse direction thereof while rotating the mesh roll, and (S33) injecting the binder emulsion during the rotation of the mesh roll and the winding of the electrode to coat the binder emulsion on a surface of the active material layer of the electrode in a mesh pattern.

In the present disclosure, the screen printing method is applied to forming of the binder coating layer.

Figure 1:
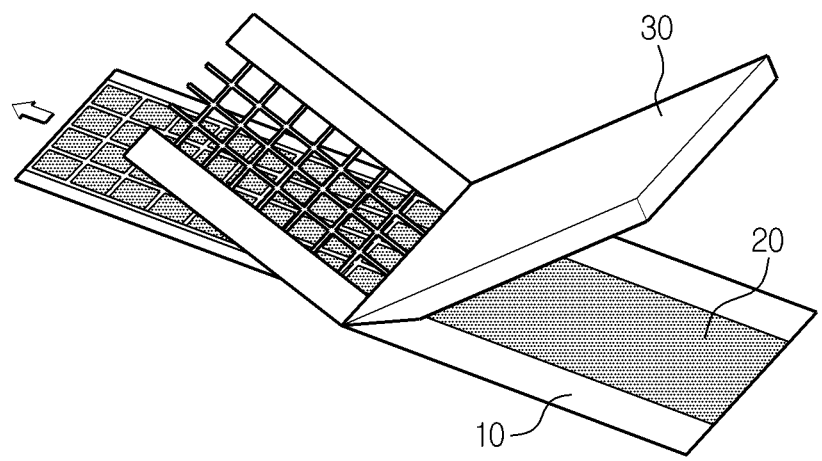
FIG. 1 is a mimetic diagram schematically illustrating a general screen printing process.

FIG. 1 is a mimetic diagram schematically illustrating a general screen printing process.

Referring to FIG. 1, screen printing is a process of injecting a paste 20 to be coated on a screen mesh 10, and then transferring the paste on a substrate to be coated through the mesh while downwardly pressing a squeegee or a roller 30. The screen printing maintains a gap of several mm between the screen mesh and the substrate, and at the moment the squeegee or the roller passes, the screen mesh contacts the substrate and transfers the paste. At this time, the viscosity of the paste may be maintained constant so that a uniform thin film coating can be achieved. A general screen printing process needs a step of separating the screen mesh from the substrate after coating the paste.

On the other hand, unlike the conventional screen printing process, the present disclosure uses a cylindrical mesh roll instead of the screen mesh, so that the separate process of separating the mesh from the substrate may be omitted.

Figure 2:
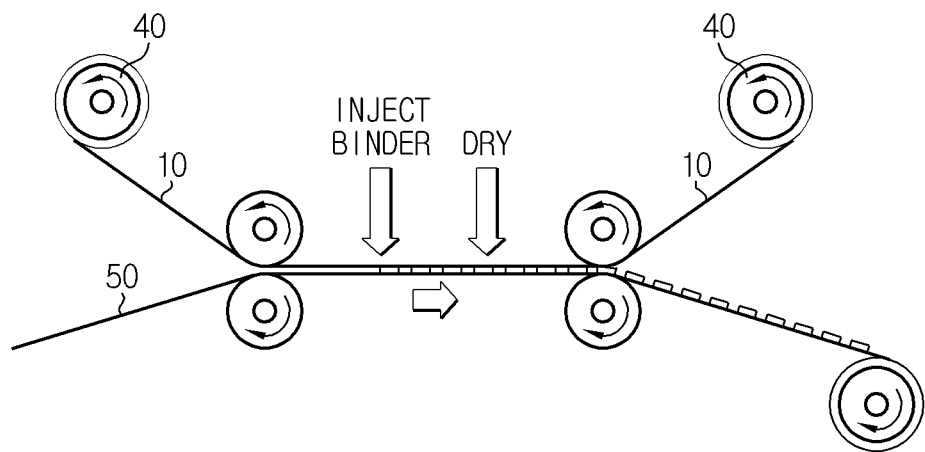
FIG. 2 is a mimetic diagram schematically illustrating a method for manufacturing an electrode according to an embodiment of the present disclosure.

Referring to FIG. 2, in the present disclosure, the active material layer of the electrode is arranged to face the cylindrical mesh roll 40, and then while rotating the mesh roll, the electrode 50 is wound in a rotating direction of the mesh roll or in a reverse direction thereof. As the mesh roll rotates, a mesh surface 10 and the active material layer of the electrode come to face each other, and when a binder emulsion is injected during the rotation, the binder emulsion that passed the mesh is transferred and coated on a surface of the active material layer of the electrode, and as the coated mesh pattern is dried continuously, a porous binder coating layer may be formed uniformly on the electrode in a thin thickness.

By such a process, not only is it possible to continuously perform the process of forming and drying a binder coating layer on the electrode while winding the electrode, but the separate process of separating the screen mesh that was required in the conventional screen printing process may be omitted.

The drying may be performed at 25 to 300° C., and preferably at 25 to 150° C. The drying may be performed using an air flow, and here the amount of water vapor forming the air flow may be within a range of 1 to 589 g/m$^3$.

When stacking the electrode and the separator, the porous binder coating layer serves as an adhesion layer that improves the adhesive strength therebetween, and may be formed in a thickness of 0.5 to 5 μm. The thickness of the porous binder layer being less than 0.5 μm would be advantageous for improving performance such as air permeability between the electrode and the separator, but the adhesion strength would not be sufficient, whereas the thickness of the porous binder layer exceeding 5 μm may be advantageous for improving the adhesion strength between the electrode and the separator but the air permeability may be degraded.

Further, as the porous binder layer is formed by coating using a mesh, it may have various patterns.

In the present disclosure, the polymer binder and the dispersion medium may be used in a weight ratio of 1:99 to 99:1.

In the present disclosure, the binder coating layer may include a polyvinylidene fluoride (PVdF)-based polymer binder. The binder is uniformly dispersed on the dispersion medium to be used in the form of emulsion, and after the dispersion medium is removed by drying after the coating, as a binder layer, it exhibits excellent adhesion strength to the separator.

Examples of the polyvinylidene fluoride (PVdF)-based binder include polyvinylidene fluoride-co-hexafluoropropylene, polyvinylidene fluoride-co-trichloroethylene, polyvinylidene fluoride-co-tetrafluoroethylene, polyvinylidene fluoride-co-trifluoroethylene, polyvinylidene fluoride-co-trifluorochloroethylene, polyvinylidene fluoride-co-ethylene and the like.

Further, dispersion media that may be used in the present disclosure include acetone, tetrahydrofuran, methylenechloride, chloroform, dimethylformamide, N-methyl-2-pyrrolidone (NMP), cyclohexane, water and a combination thereof. These dispersion media are removed in the process of drying the coating layer.

As aforementioned, the porous binder coating layer formed according to the present disclosure not only realizes thinning as the adhesion layer, but may also improve the adhesiveness of the electrode and the separator while minimizing output degradation of the battery.

In the present disclosure, the electrode for forming the porous binder coating layer is not particularly limited, but may be manufactured by forming an electrode active material layer on at least one surface of the current collector of the electrode according to a conventional method well-known in the related field.

If the electrode is an anode, the active material layer may include any one an active material particle selected from a group consisting of natural graphite, artificial graphite, or a carbonaceous material; metal (Me) such as Li-containing titanium complex oxide (LTO), Si, Sn, Li, Zn, Mg, Cd, Ce, Ni or Fe; alloy composed of the metal (Me); oxide (MeOx) of the metal (Me); and a composite of the metal (Me) and carbon, or a mixture of two or more thereof, and if the electrode is a cathode, the active material layer may include an active material particle selected from a group consisting of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (M1 and M2 are, independently from each other, one selected from a group consisting of Al, Ni, Co, Fe, Mn, V, Cr, Ti, W, Ta, Mg and Mo, and x, y and z are, independently from one another, atomic fractions of elements constituting oxides, $0 \leq x < 0.5$, $0 \leq y < 0.5$, $0 \leq z < 0.5$, and $0 < x+y+z \leq 1$) or a mixture of two or more thereof, but the present disclosed is not particularly limited thereto.

Further, as the current collector being used in the electrode, foil manufactured from aluminum, nickel or a combination thereof may be used as the current collector for use in the cathode, and foil manufactured from copper, gold, nickel, copper alloy or a combination thereof may be used as the current collector for use in the anode, but the present disclosure is not particularly limited thereto.

According to an additional aspect of the present disclosure, in a lithium secondary battery including a cathode, an anode, a separator interposed between the cathode and the anode, and a nonaqueous electrolyte, at least one of the cathode and the anode is the electrode mentioned above.

The lithium secondary battery may be a lithium metal secondary battery, a lithium ion secondary battery, a lithium polymer secondary battery or a lithium ion polymer secondary battery.

Any type of porous substrate conventionally being used in the related field to separate an anode and a cathode may be used in the present disclosure, for example, a polyolefin-based porous membrane or non-woven fabric, and on at least one surface of the porous substrate, a porous coating layer including an inorganic particle and a binder polymer may be further provided, but there is no particular limitation thereto.

Further, the nonaqueous electrolyte being used in the present disclosure may include an organic solvent and an electrolyte salt, and the electrolyte salt is a lithium salt. Any type of lithium salt conventionally being used in the non-aqueous electrolyte for use in a lithium secondary battery may be used without limitation. Examples of negative ions of the lithium salt include one, or two or more selected from a group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_5PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The present disclosure has been described in detail. However, it should be understood that the detailed description and specific examples, while indicating preferred embodiments of the disclosure, are given by way of illustration only, and various changes and modifications within the scope of the disclosure will become apparent to those skilled in the art from this detailed description.

DESCRIPTION OF REFERENCE NUMERALS

10: SCREEN MESH
20: PASTE
30: SQUEEGEE OR ROLLER
40: MESH ROLL
50: ELECTRODE

What is claimed is:

1. A method for manufacturing an electrode with a porous binder coating layer, the method comprising:
coating a binder emulsion through a mesh surface of a mesh and onto a surface of an active material layer of an electrode to form a porous binder coating layer having a mesh pattern, wherein the binder emulsion comprises a binder and a dispersion medium, and wherein the electrode comprises the active material layer and a current collector, the active material layer disposed on at least one surface of the current collector,
wherein the mesh is applied in the form of a roll, and
wherein coating the binder emulsion through the mesh further comprises:
rotating the mesh roll;
winding the electrode in a reverse direction thereof while rotating the mesh roll such that the mesh surface and active material layer face each other; and
injecting the binder emulsion through the mesh surface and onto the surface of the active material layer during the rotation of the mesh roll and the winding of the electrode to form the porous binder coating layer having the mesh pattern.

2. The method of claim 1, wherein the porous binder coating layer is dried during the rotation of the mesh roll and the winding of the electrode.

3. The method of claim 2, wherein the drying is performed at 25 to 300° C.

4. The method of claim 2, wherein the drying is performed using an air flow, and an amount of water vapor forming the air flow is 1 to 589 $g/m^3$.

5. The method of claim 1, wherein the porous binder coating layer is formed in a thickness of 0.5 to 5 μm.

6. The method of claim 1, wherein, in the binder emulsion, the binder and the dispersion medium are provided in a weight ratio of 1:99 to 99:1.

7. The method of claim 1, wherein the binder is a polyvinylidene fluoride (PVdF)-based polymer.

8. The method of claim 7, wherein the PVdF-based polymer is selected from a group consisting of polyvinylidene fluoride-co-hexafluoropropylene, polyvinylidene fluoride-co-trichloroethylene, polyvinylidene fluoride-co-tetrafluoroethylene, polyvinylidene fluoride-co-trifluoroethylene, polyvinylidene fluoride-co-trifluorochloroethylene, polyvinylidene fluoride-co-ethylene, and a mixture of two or more thereof.

9. The method of claim 1, wherein the dispersion medium is acetone, tetrahydrofuran, methylenechloride, chloroform, dimethylformamide, N-methyl-2-pyrrolidone (NMP), cyclohexane, water or a combination thereof.

* * * * *